US006767662B2

(12) United States Patent
Jacobson et al.

(10) Patent No.: US 6,767,662 B2
(45) Date of Patent: Jul. 27, 2004

(54) ELECTROCHEMICAL DEVICE AND PROCESS OF MAKING

(75) Inventors: Craig P. Jacobson, Lafayette, CA (US); Steven J. Visco, Berkeley, CA (US); Lutgard C. De Jonghe, Lafayette, CA (US)

(73) Assignee: The Regents of the University of California, Oakland, CA (US)

( * ) Notice: Subject to any disclaimer, the term of this patent is extended or adjusted under 35 U.S.C. 154(b) by 59 days.

(21) Appl. No.: 09/974,936

(22) Filed: Oct. 10, 2001

(65) Prior Publication Data

US 2002/0081762 A1 Jun. 27, 2002

Related U.S. Application Data

(60) Provisional application No. 60/239,472, filed on Oct. 10, 2000.

(51) Int. Cl.[7] .......................... H01M 8/12; C04B 33/32
(52) U.S. Cl. .......................... 429/30; 429/31; 264/618; 264/642
(58) Field of Search ...................... 429/30, 31; 264/618, 264/642

(56) References Cited

U.S. PATENT DOCUMENTS

| | | |
|---|---|---|
| 5,035,962 A | 7/1991 | Jensen |
| 5,169,811 A | 12/1992 | Cipollini et al. |
| 5,219,673 A | 6/1993 | Kaun |
| 5,286,322 A * | 2/1994 | Armstrong et al. ..... 264/618 X |
| 5,314,765 A | 5/1994 | Bates |
| 5,328,779 A | 7/1994 | Tannenberger et al. ....... 429/32 |
| 5,336,569 A * | 8/1994 | Misawa et al. ............... 429/31 |
| 5,338,625 A | 8/1994 | Bates et al. |
| 5,342,705 A | 8/1994 | Minh et al. |
| 5,342,710 A | 8/1994 | Koksbang |
| 5,356,730 A | 10/1994 | Minh et al. |
| 5,366,770 A | 11/1994 | Wang .......................... 505/477 |
| 5,389,456 A * | 2/1995 | Singh et al. ............... 429/31 X |
| 5,455,126 A | 10/1995 | Bates et al. |
| 5,480,739 A | 1/1996 | Kawasaki et al. |
| 5,512,147 A | 4/1996 | Bates et al. |
| 5,532,071 A | 7/1996 | Pal et al. |
| 5,538,814 A | 7/1996 | Kamauchi et al. |
| 5,567,210 A | 10/1996 | Bates et al. |
| 5,569,520 A | 10/1996 | Bates |
| 5,589,017 A | 12/1996 | Minh |
| 5,589,285 A | 12/1996 | Cable et al. |
| 5,597,660 A | 1/1997 | Bates et al. |

(List continued on next page.)

FOREIGN PATENT DOCUMENTS

| | | |
|---|---|---|
| EP | 399833 A1 | 11/1990 |
| EP | 0476808 | 3/1992 |
| EP | 0497542 | 8/1992 |
| EP | 0513982 | 11/1992 |
| EP | 0524013 | 1/1993 |
| EP | 0 111 214 | 1/1998 |

OTHER PUBLICATIONS

Fujii, K., et al., "Manufacturing and Characterization of Metallic System Support Tube for Solid Oxide Fuel Cells", Bulletin of the Electrotechnical Laboratory, vol. 62, No. 1–2, 1998, pp. 1319, (month unknown).

Momma, et al., "High Potential Performance of Tubular Type SOFC Using Metallic System Components", Electrotechnical Laboratory, Electrochemical Proceedings vol. 97–40, Jun. 1997, pp. 310–321.

(List continued on next page.)

*Primary Examiner*—Stephen J. Kalafut
(74) *Attorney, Agent, or Firm*—Charles R. Nold; Lawrence Berkeley National Laboratory

(57) ABSTRACT

A process of making an electrochemical device comprising providing a trilayer structure comprising an electrode/electrolyte/electrode and simultaneously sintering the trilayer structure.

37 Claims, 4 Drawing Sheets

U.S. PATENT DOCUMENTS

| | | | |
|---|---|---|---|
| 5,612,152 | A | 3/1997 | Bates |
| 5,648,487 | A | 7/1997 | Beriger et al. |
| 5,670,270 | A | 9/1997 | Wallin |
| 5,686,201 | A | 11/1997 | Chu |
| 5,725,965 | A | 3/1998 | Wachsman et al. |
| 5,788,788 | A | 8/1998 | Minh |
| 5,814,420 | A | 9/1998 | Chu |
| 5,824,434 | A | 10/1998 | Kawakami et al. |
| 5,882,809 | A * | 3/1999 | McPheeters et al. .... 429/618 X |
| 5,932,368 | A | 8/1999 | Batawi et al. |
| 5,985,476 | A | 11/1999 | Wachsman et al. |
| 5,993,985 | A | 11/1999 | Borglum |
| 5,993,986 | A | 11/1999 | Wallin et al. |
| 6,025,094 | A | 2/2000 | Visco et al. |
| 6,051,173 | A * | 4/2000 | Fasano et al. .......... 264/618 X |
| 6,051,330 | A * | 4/2000 | Fasano et al. ................ 429/30 |
| 6,228,520 | B1 | 5/2001 | Chiao |
| 2002/0048699 | A1 | 4/2002 | Steele et al. |

OTHER PUBLICATIONS

Okuo, et al., "Development of Metallic Substrate Tubular SOFC", Electrotechnical Laboratory, Oct. 1994, pp. 908–919.

Okuo, T., et al., "Improvement in Power Stability and Durability Demonstration on New Tubular Type SOFC Using Metallic System Component", vol. 60, No. 5, 1996 pp. 1–9, (month unknown).

Schiller, G., et al., "Development of Metallic Substrate Supported Thin–Film SOFC by Applying Plasma Spray Techniques", Electrochemical Society Proceedings vol. 99–19, Oct. 1999, pp. 892–903.

Schiller, G., et al., "Development of Plasma Sprayed Components for a New SOFC Designs", Electrochemical Proceedings vol. 97–40, Oct. 1999, pp. 634–645.

Schiller, G. et al., "Development of SOFC Components by Vacuum Plasma Spraying", 1998, pp. 515–518, (month unknown).

Takenoiri, et al., "Development of Metallic Substrate Supported Planar SOFC at Fuji Electric", Fuel Cell Seminar Abstracts, Nov. 1998, pp. 84–87.

Unal, et al., "Microstructures of $Y_2O_3$–Stabilized $ZrO_2$ Electron Beam–Physical Vapor Deposition Coatings on Ni–Base Superalloys", Department of Materials Science and Engineering, vol. 984–92, 1994, pp. 984–992, (month unknown).

Wallin, et al., "Cofired Solid Oxide Fuel Cells for Operation at 800°C", abstract, (month unknown).

Christiansen, "Solid Oxide Fuel Cell", Aug. 9, 2001, U. S. patent application Publication, Pub. No. US 2001/0012576 A1.

Seabaugh, et al., "Low–Cost Fabrication Processes for Solid Oxide Fuel Cells", Oct. 30, 2000, NexTech Materials, Ltd.

Yao, et al., Improved Preparation procedure and properties for a multilayer piezoelectric thick–film actuator, Sensors and Actuators, A 71 (1998) 139–143, (month unknown).

* cited by examiner

ELECTROCHEMICAL DEVICE AND PROCESS OF MAKING

CROSS REFERENCE TO RELATED APPLICATIONS

This application claims priority to application Ser. No. 60/239,472, filed Oct. 10, 2000, the contents of which are hereby incorporated by reference in their entirety.

STATEMENT REGARDING FEDERALLY SPONSORED RESEARCH OR DEVELOPMENT

This invention was made with government support under Grant (Contract) No. DE-AC03-76F00098 awarded by The United States Department of Energy. The government has certain rights to this invention.

BACKGROUND OF THE INVENTION

The present invention relates generally to the field of solid-state electrochemical devices, and more particularly to a novel structure for an electrode/electrolyte/electrode with an unusual an unexpected electrochemical performance.

Solid-state electrochemical devices are often implemented as cells including two porous electrodes, the anode and the cathode, and a dense solid electrolyte and/or membrane, which separate the electrodes. For the purposes of this application, unless otherwise explicit or clear from the context in which it is used, the term "electrolyte" should be understood to include solid oxide membranes used in electrochemical devices, whether or not potential is applied or developed across them during operation of the device. In many implementations, such as in fuel cells and oxygen and syn-gas ($H_2$+CO) generators, the solid membrane is an electrolyte composed of a material capable of conducting ionic species, such as oxygen ions, or hydrogen ions, yet has a low electronic conductivity. In other implementations, such as gas separation devices, the solid membrane is composed of a mixed ionic electronic conducting material ("MIEC"). In each case, the electrolyte/membrane must be dense and pinhole free ("gas-tight") to prevent mixing of the electrochemical reactants. In all of these devices a lower total internal resistance of the cell improves performance.

The ceramic materials used in conventional solid-state electrochemical device implementations can be expensive to manufacture, difficult to maintain (due to their brittleness) an d have inherently high electrical resistance. The ionic resistance may be reduced by operating the devices at high temperatures, typically in excess of 900° C. However, such high temperature operation has significant drawbacks with regard to the device maintenance and the materials available for incorporation into a device, particularly in the oxidizing environment of an oxygen electrode, for example.

The preparation of solid-state electrochemical cells is well known. For example, a typical solid oxide fuel cell (SOFC) is composed of a dense electrolyte membrane of a ceramic oxygen ion conductor, a porous anode layer of a ceramic, a metal or, most commonly, a ceramic-metal composite ("cermet"), in contact with the electrolyte membrane on the fuel side of the cell, and a porous cathode layer of a mixed ionically/electronically-conductive (MIEC) metal oxide on the oxidant side of the cell. Electricity is generated through the electrochemical reaction between a fuel (typically hydrogen produced from reformed methane) and an oxidant (typically air). This net electrochemical reaction involves charge transfer steps that occur at the interface between the ionically-conductive electrolyte membrane, the electronically-conductive electrode and the vapor phase (fuel or oxygen). The contributions of charge transfer, mass transfer (gas diffusion in porous electrode), and ohmic resistance to the total internal resistance of a solid oxide fuel cell device during electronic and ionic current flow can be significant. Moreover, in typical device designs, a plurality of cells are stacked together and connected by one or more interconnects. Resistive loss attributable to these interconnects can also be significant.

In work reported by de Souza et al. (de Souza, S.; Visco, S. J.; De Jonghe, L. C. Reduced-temperature solid oxide fuel cell based on YSZ thin-film electrolyte. Journal of the Electrochemical Society, vol.144, (no.3), Electrochem. Soc, March 1997. p.L35-7.7), a thin film of yttria stabilized zirconia (YSZ) is deposited onto a porous cermet electrode substrate and the green assembly is co-fired to yield a dense YSZ film on a porous cermet electrode. A thin cathode is then deposited onto the bilayer, fired, and the assembly is tested as an SOFC with good results. In work reported by Minh (Minh, N. Q. (Edited by: Dokiya, M.; Yamamoto, O.; Tagawa, H.; Singhal, S. C.) Development of thin-film solid oxide fuel cells for power generation applications. Proceedings of the Fourth International Symposium on Solid Oxide Fuel Cells (SOFC-IV), (Proceedings of the Fourth International Symposium on Solid Oxide Fuel Cells (SOFC-IV), Proceedings of Fourth International Symposium Solid Oxide Fuel Cells, Yokohama, Japan, 18-Jun. 23, 1995.) Pennington, N.J., USA: Electrochem. Soc, 1995. p.138–45), a similar thin-film SOFC is fabricated by tape calendaring techniques to yield a good performing device. However, these Ni-YSZ supported thin-film structures are mechanically weak, and will deteriorate if exposed to air on SOFC cool-down due to the oxidation of Ni to NiO in oxidizing environments. Also, nickel is a relatively expensive material, and to use a thick Ni-YSZ substrate as a mechanical support in a solid-state electrochemical device will impose large cost penalties.

Solid-state electrochemical devices are becoming increasingly important for a variety of applications including energy generation, oxygen separation, hydrogen separation, coal gasification, and selective oxidation of hydrocarbons. These devices are typically based on electrochemical cells with ceramic electrodes and electrolytes and have two basic designs: tubular and planar. Tubular designs have traditionally been more easily implemented than planar designs, and thus have been proposed for commercial applications. However, tubular designs provide less power density than planar designs due to their inherently relatively long current path that results in substantial resistive power loss. Planar designs are theoretically more efficient than tubular designs, but are generally recognized as having significant safety and reliability issues due to the complexity of sealing and manifolding a planar stack.

Thus, solid state electrochemical devices incorporating current implementations of these cell designs are expensive to manufacture and may suffer from safety, reliability, and/or efficiency drawbacks. Some recent attempts have been made to develop SOFCs capable of operating efficiently at lower temperatures and using less expensive materials and production techniques. Plasma spray deposition of molten electrolyte material on porous device substrates has been proposed, however these plasma sprayed layers are still sufficiently thick (reportedly 30–50 microns) to substantially impact electrolyte conductance and therefore device operating temperature.

Accordingly, a way of reducing the materials and manufacturing costs and increasing the reliability of solid state electrochemical devices would be of great benefit and, for example, might allow for the commercialization of such devices previously too expensive, inefficient or unreliable.

Thin films as disclosed here in find use in electrochemical devices and as barrier coatings when deposited on dense substrates. Applications include but are not limited to: fuel cells, oxygen separation, hydrogen separation, mixed ionic electronic thin film devices, sensors, magnetic films (perovskites), wear resistant applications, barrier coatings, oxidation resistant coating and thermal barrier coatings.

Prior art structures are constructed by a co-firing method whereby an electrolyte was cofired onto a substrate, typically an electrode. A counter electrode was then bonded onto the resultant structure. Co-firing of a bi-layer rather than a tri-layer was done for several reasons. First, the temperature required for sintering of the thin-film electrolyte was high enough that reaction between the thin film electrolyte and counter electrode would lead to a resistive interface. Second, it was believed that in order to achieve good electrode performance the surface area of the counter electrode had to be maximized. High surface area counter electrodes were fabricated by applying a high surface area powder to a fired bilayer and firing the counter electrode at a temperature sufficient for bonding, but not high enough for significant densification of the electrode. The co-firing method suffers from other disadvantages. By firing each electrode separately, uniform neck size could be difficult to achieve in each electrode/electrolyte interface, and subsequently device performance could suffer. Also, dual firing exposes one electrode to two sintering processes, and the attendant disadvantages therein.

Porous composite electrodes in contact with a dense electrolyte membrane and methods of making them are known in the art and disclosed in U.S. Pat. No. 5,670,270, the contents of which are hereby incorporated by reference in its entirety. U.S. Pat. No. 3,377,203 discloses a method for producing fuel cells of solid electrolyte and ceramic oxide electrode layers by sintering the electrode layers to the electrolyte. U.S. Pat. No. 4,767,518 discloses a solid oxide electrode (anode) made of metal particles that are immobilized by stabilized zirconia which may also contain praseodymium (Pr). The Pr may be added in the form of a solution. U.S. Pat. No. 4,885,078 discloses an electrochemical device which may be a solid oxide cell which comprises a porous electrode containing a deposit of metal oxide or metal salt capable of forming metal oxide upon heating, where the metal may be Pr. U.S. Pat. No. 5,021,304 discloses a method of coating a separate electronically conducted layer on a porous electrode having the steps of applying a mixture of metal salts including nitrates to the electrodes with a surfactant, and heating to form the oxides. Pr oxide is included in a list of dopant oxides which may be used.

SUMMARY OF THE INVENTION

In general, the present invention provides low-cost, mechanically strong, porous structures for a variety of uses, techniques for forming these structures, and devices incorporating the structures. In preferred embodiments, the invention provides a porous electrode/electrolyte/electrode structure designed for high strength and high electronic conductivity (to lower resistive losses in the device due to current collection).

The invention provides solid-state electrochemical devices of novel composition and techniques for forming thin electrode/electrolyte/electrode structures, alternatively provided on novel or more conventional substrates. In particular, in one embodiment the invention provides techniques for firing of a device comprising a three layer structure comprising a first electrode/electrolyte/second electrode. The electrolyte layer may be 1 to 50 microns thick, preferably 5 to 20 microns thick. The trilayer structure comprising an electrode/electrolyte/electrode may be anywhere from about 10 $\mu$m to about 2000 $\mu$m thick. The composite article of the present invention using the trilayer structure formed according to the process of this invention may be any thickness, depending on the thickness of the additional layers. For example, a substrate/support of 1 mm may be employed.

In one aspect, the present invention provides a method of forming an electrode/electrolyte/electrode structure on a solid-state electrochemical device substrate. The method involves providing a solid-state electrochemical device substrate, the substrate composed of a porous non-noble transition metal, a porous non-noble transition metal alloy, or porous cermet incorporating one or more of a non-noble non-nickel transition metal and a non-noble transition metal alloy. The substrate may optionally be coated with a material having high electrocatalytic activity for a specific purpose, for example methane reformation, or oxygen or hydrogen ion formation (e.g., Ni-YSZ). Onto the substrate is bonded or affixed by any method known in the art an electrode/electrolyte/electrode structure provided for by the instant invention.

In another aspect of the invention there it is contemplated using the electrode/electrolyte/electrode structure as an oxygen separation device, catalytic reactor or solid oxide fuel cell.

Substrates contemplated for use in the instant invention include: a substrate for a solid state electrochemical device composed of a porous cermet incorporating one or more of the transition metals Cr, Fe, Cu and Ag.

These and other features and advantages of the present invention will be presented in more detail in the following specification of the invention and the accompanying figures, which illustrate by way of example the principles of the invention.

BRIEF DESCRIPTION OF THE DRAWINGS

The present invention will be readily understood by the following detailed description in conjunction with the accompanying drawing.

DETAILED DESCRIPTION OF THE PREFERRED EMBODIMENTS

Figure 1:
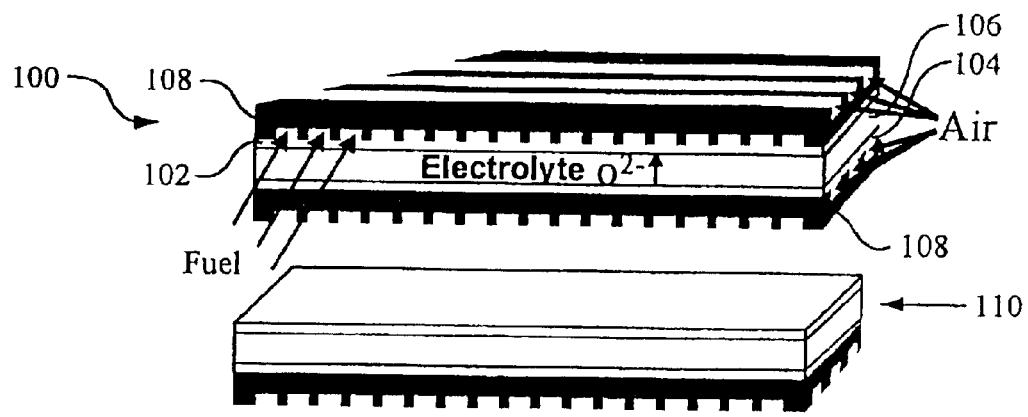
FIG. 1 depicts a planar design for a prior art solid-state electrochemical device.

Reference will now be made in detail to some specific embodiments of the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Electrodes in accordance with this invention are composed of a cermet or a mixed ionic-electronic conductor (MIEC) or a mixture of ionic conductor and MWEC or a mixture of ionic conductor and electronic conductor.

Contemplated herein is a trilayer structure fabricated comprising an electrode in contact with a thin electrolyte layer in contact with a counter electrode. The electrode may be composed of an interconnected pore phase, and interconnected electronic conductor, and an interconnected ionic conductor. All three (or more) phases are interpenetrating, resulting in three phase boundaries throughout. Both pores and particles in the electrodes are greater than about 0.5 $\mu$m and less than about 20 $\mu$m in diameter. When there are ionic conducting particles in the first and/or second electrodes, it is preferred that these particles be between about 0.25 $\mu$m and about 20 $\mu$m, preferably about between 0.25 $\mu$m and about 10 $\mu$m, more preferably between about 0.5 $\mu$m and about 2 $\mu$m.

It is known that addition of YSZ to NiO and YSZ to LSM electrodes improves performance. The inventors, through numerous investigations, have surprisingly found that trilayer devices formed according to the process of the invention described herein leads to unexpected performance in thin film devices.

In general, the present invention provides low-cost, mechanically strong, highly electronically conductive electrode/electrolyte/electrode structures for solid-state electrochemical devices.

The invention provides structures and techniques for economically producing solid-state electrochemical cells operable at relatively low temperatures with good performance characteristics.

The solid electrolyte membrane generally comprises a material capable of conducting ionic species, such as oxygen ions, sodium ions, fluoride ions, or hydrogen ions, but also has a low electrical conductivity. Also, the electrolyte must be impermeable to any present electrochemical reactants.

In particular, in one embodiment the invention provides techniques for firing of devices comprising an electrode, an electrolyte layer and an electrode layer to form densified structures with the electrolyte layer 1 to 50 microns thick, preferably 5 to 20 microns thick. In an embodiment it is contemplated that the layers and/or substrate material is "green". In this application, the term "green" refers to materials that are unfired, or possibly pre-fired with sufficient heat to provide mechanical integrity to the material for handling, but not enough to produce any substantial dimensional change (also referred to in the art as "bisque firing").

Introduction

An overview of solid-state device components and construction, and the two basic designs follows. This description is provided both by way of background and introduction to the subject, and to provide design and fabrication details that may be adopted in compositions, devices, and methods in accordance with the present invention.

FIG. 1 illustrates a basic planar design for a solid-state electrochemical device, for example, a solid oxide fuel cell (SOFC). The cell 100 includes an anode 102 (the "fuel electrode") and a cathode 104 (the "air electrode") and a solid electrolyte 106 separating the two electrodes. In conventional SOFCs, the electrodes and electrolytes are typically formed from ceramic materials, since ceramics are able to withstand the high temperatures at which the devices are operated. For example, SOFCs are conventionally operated at about 950° C. This operating temperature is determined by a number of factors, in particular, the temperature required for the reformation of methane to produce hydrogen and reaction efficiency considerations. Also, typical solid-state ionic devices such as SOFCs have a structural element onto which the SOFC is built. In conventional planar SOFCs the structural element is a thick solid electrolyte plate such as yttria-stabilized zirconia (YSZ); the porous electrodes are then screen-printed onto the electrolyte. The porous electrodes are of low strength and are not highly conductive. Alternatively, a thick porous electrode and a thin electrolyte membrane can be co-fired, yielding an electrode/electrolyte bilayer. As noted above, for the case where the electrode is a Ni-YSZ electrode of a few mm in thickness, the electrode strength is low and the cost of raw materials high.

Methane (natural gas) is plentiful, inexpensive, and rich in hydrogen, the actual fuel for the cell, and as such, is the preferred fuel source for a SOFC. Methane may be reformed to produce hydrogen at a temperature of about 650–950° C. Therefore, it is desirable to operate a SOFC at least at the lower end of this temperature range.

Another consideration governing the temperature at which a SOFC or any solid-state electrochemical device is operated is the electrolyte/membrane conductivity. Conventional devices must be operated at a high enough temperature to make the ceramic electrolyte sufficiently ionically conductive for the energy producing reactions (in the case of a SOFC; other reactions for gas separators or generators). The thickness of the solid electrolyte, typically hundreds of microns thick, favors an operating temperature above 900° C. to achieve an acceptable conductivity. Methods exist for forming thin electrolytes on ceramic substrates, such as EVD/CVD. However, EVD/CVD is a complex and expensive technique, and the ceramic-based devices to which the technique has been applied still require high operating temperatures to be at all efficient. Unfortunately, most metals are not stable at this temperature in an oxidizing environment and very quickly become converted to brittle oxides. Accordingly, solid-state electrochemical devices have conventionally been constructed of heat-tolerant ceramic materials, such as $La_{1-x}Sr_xMn_yO_{3-\delta}$ ($1 \geq x \geq 0.05$) ($0.95 \leq y \leq 1.15$) ($\delta$ is defined here and throughout the specification where ever used, as that value signifying a small deviation from perfect stoichiometry known to those of ordinary skill in the art) ("LSM"), and yttria stabilized zirconia (e.g., $(ZrO_2)_{0.92}(Y_2O_3)_{0.08}$) ("YSZ"). In an SOFC, this limitation is most problematic at the air electrode where oxidation can take place. In other solid-state electrochemical devices, such as oxygen generators, both electrodes may be in an oxidizing environment during operation of the device, and so both may face this problem.

Referring again to FIG. 1, the cell 100 is depicted in the form in which it could be stacked with other like cells 110, as it typically would be to increase the capacity of the device. To be stacked, the cells require bipolar interconnects 108 adjacent to each electrode that are electrically, but not ionically, conductive. The interconnects 108 allow current generated in the cells to flow between cells and be collected for use. These interconnects are typically formed into manifolds through which fuel and air may be supplied to the respective electrodes (allow lateral movement of gas in channels; but not allow intermixing of gas (vertical movement)). Due to the highly exothermic combustion resulting from an uncontrolled mixture of hydrogen and oxygen, it is essential that the interconnect manifolds by well sealed at all edges of the planar cell. Moreover, due to required operating temperatures in excess of 900° C. (e.g., 950° C.) for conventional devices, the interconnect in contact with the air electrode may not be made of metal due to high temperature corrosion.

Prior designs for solid-state electrochemical planar stack devices have used ceramic materials such as lanthanum chromite to form interconnects. However, lanthanum chromite is a very expensive material, sometimes accounting for as much as 90% of the cost of a device. In addition, it is a relatively brittle material (relative to metal); less than ideal for an application requiring an absolute seal, and is significantly less conductive than metal, resulting in resistive losses that reduce the overall efficiency of the device. These problems have combined to make current planar stack implementations impractical for commercial applications.

Figure 2A:
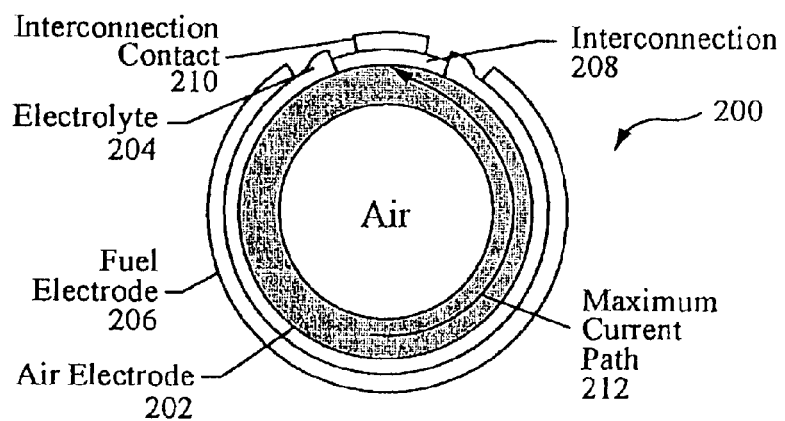
FIGS. 2A, B and C depict a tubular design for a prior art solid-state electrochemical device.
Figure 2B:
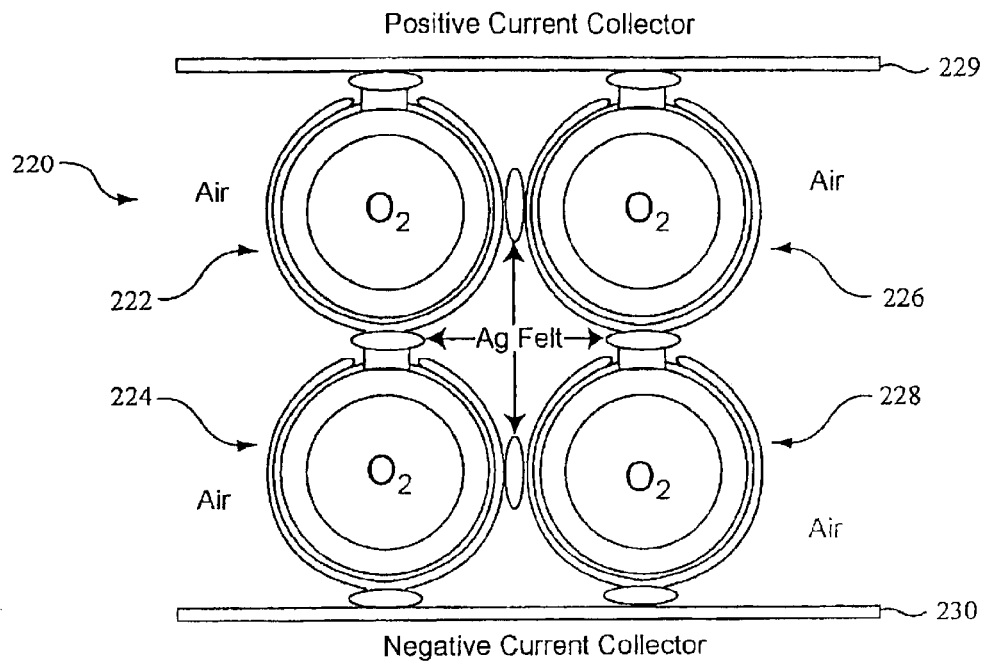
Figure 2C:
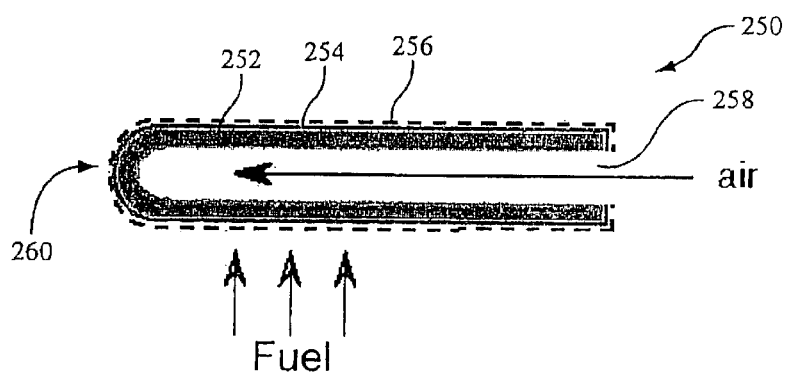

An alternative solid state electrochemical device design generally recognized as having much reduced safety concerns and greater reliability is depicted in FIGS. 2A–C. This design, commercialized by SWPC, for example, has a tubular shape. FIG. 2A depicts an axial cross-sectional view of a tubular SOFC 200. The inner tube is the air electrode 202, again formed from a solid ceramic material such as LSM. The air electrode 202 is coated with a solid electrolyte 204 for most of its circumference. The electrolyte is coated with the fuel electrode 206. During operation, air is flowed through the interior of the tube, while fuel (generally methane that is reformed to hydrogen during operation of the cell) is provided outside the tube. In the case of the tubular SOFC, one of the major fabrication costs is associated with the deposition of the electrolyte film by conventional chemical vapor deposition-electrochemical vapor deposition (CVD-EVD) techniques.

In order to get current produced by the fuel cell out, an electrically conductive material in contact with the electrodes is required. The material must also provide a chemical barrier to prevent intermixing of the hydrogen fuel outside the tube and the air inside. An interconnect 208, again typically composed of lanthanum chromite, is provided on the air electrode 202 over that portion of the circumference not covered by the electrolyte 204. The interconnect is also typically has an interconnect contact 210 attached to it. This arrangement also allows for the stacking of tubes, as illustrated in FIG. 2B, which depicts a stacked cell device 220 composed of four tubular cells 222, 224, 226, 228, in this case oxygen generation cells, but otherwise as described above, stacked and interconnected (for example using Ag felt interconnect contacts) between a positive current collector 229 and a negative current collector 230.

FIG. 2C depicts a length-wise cross sectional view of a tubular solid-state electrochemical device, such as depicted in FIG. 2A. The device 250 has a tubular shape formed by a porous air electrode 252, and electrolyte 254, and a porous fuel electrode 256 in the case of an SOFC application of the device. The tube-shaped device has an open end 258 available for providing a gas reactant, such as air in the case of an SOFC (as shown), or extracting a gas product, such as oxygen in the gas of an oxygen generator, and a closed end 260 to contain and separate the gas inside the tube from that outside. In the case of a SOFC, the fuel gas, e.g., hydrogen or methane, is typically provided outside the tube.

In this design, the seal preventing intermixing of reactant gasses, such as hydrogen fuel and air in a SOFC, are much more easily implemented. Rather than requiring a seal around all the edges, as in a planer device, the tubular device need only be sealed at the open end 258 of the tube (or can even be seal less and allowed to leak). Moreover, this end may be located out of the hot zone of the operational device. This makes the seal easier to maintain and thus renders the device more safe and reliable than conventional planar designs.

However, the tubular design has the significant drawback that current collection for the whole tube occurs at only a small area on the circumference of the tube. Referring to FIG. 2A, all current coming from all around the tube gets collected at the interconnect 208. Thus, the maximum current path 212 is about half the circumference of the tube, which may be centimeters as opposed to microns as in the case for the planar implementation. The resistive loss inherent to this design in conventional implementations can be more fully appreciated with reference to FIG. 2B where a tubular device stack is shown. Each cell in the stack contributes to a very large total internal resistance for the device 220. As a result, the tubular implementation has much lower power density than the planar devices, making the development of high power density devices using this design impractical. In addition, this design retains the drawback of being composed of materials (ceramic electrodes and interconnects) that contribute significantly to the device's internal resistive losses, thereby limiting power density While the designs depicted and described in FIGS. 1 and 2A–C are intended for use as a SOFC, the same or a similar device designs might also be used for gas separation or generation depending on the selection of materials used as the electrodes and separators, the environment in which the device is operated (gases supplied at each electrode), pressures or electrical potentials applied, and the operation of the device. For example, as described above, for a fuel cell, a hydrogen-based fuel (typically methane that is reformed to hydrogen during operation of the device) is provided at the fuel electrode and air is provided at the air electrode. Oxygen ions ($O^{2-}$) formed at the air electrode/electrolyte interface migrate through the electrolyte and react with the hydrogen at the fuel electrode/electrolyte interface to form water, thereby releasing electrical energy that is collected by the interconnect/current collector.

In the case of the fuel cell, the electrolyte it is contemplated is composed of a solely ionic conducting material, such as yttria-stabilized zirconia (YSZ). If the same device is operated as an electrolytic device, that is, rather than getting energy out of the device, energy is provided to the device as a potential applied across the two electrodes, ions formed from gas (e.g., oxygen ions from air) at the cathode will migrate through the electrolyte (which is selected for its conductivity of ions of a desired pure gas) to produce pure gas (e.g., oxygen) at the anode. If the electrolyte is a proton conducting thin film (for example, doped $BaCeO_3$, doped $SrCeO_3$ or doped $SrZrO_3$) instead of an oxygen ion conductor, the device could be used to separate hydrogen from a feed gas containing hydrogen mixed with other impurities, for instance resulting from the steam reformation of methane ($CH_4+H_2O=3H_2+CO$). Protons (hydrogen ions)

formed from the H$_2$/CO mixture at one electrode/thin film interface could migrate across the thin film driven by a potential applied across the electrodes to produce high purity hydrogen at the other electrode. Thus the device may operate as a gas generator/purifier.

Such a device could also function as an electrochemical syn gas generator. Syn gas (H$_2$+CO) is a valuable product used for synthesis of higher value organics. It is typically produced by the partial oxidation of methane with pure oxygen. Since the pure oxygen must be separated from air in a separate process, syn gas production is relatively expensive. In this case, the feed to the fuel electrode is methane, and air is supplied to cathode, as with the fuel cell. However, the device is run at a current density where methane is only partially oxidized to H$_2$ and CO, as opposed to deep oxidation in typical fuel cell operation to produce H$_2$O and CO$_2$.

If the solely ionically conducting electrolyte is replaced with a mixed ionic electronic conducting (MIEC) membrane, such as LSC, and instead of applying a potential across the electrodes, air at high pressure is provided on one side of the membrane, oxygen ions formed from the air at the membrane will migrate through the membrane to produce pure oxygen at the other side of the membrane. Thus the device may operate as an oxygen gas separator.

The electrodes may be composed of one or more materials classified as electronic and/or MIEC and an ionic conductor or MIEC.

Other non-limiting examples contemplated by the instant invention include operating the electrode/electrolyte/ electrode structure as an oxygen separation or catalytic reactor using a LSM-YSZ/YSZ/LSM-YSZ structure. A LSM-YSZ/YSZ/NiO-YSZ structure is contemplated for a solid oxide fuel cell. A NiO—SrZrO/SrZrO/NiO—SrZrO is contemplated for hydrogen separation or catalytic reactors. A NiO—SrZrO/SrZrO/LSM—SrZrO is contemplated for solid oxide fuel cells. A Ag—Bi$_2$O$_3$/Bi$_2$O$_3$/Ag—Bi$_2$O$_3$ structure is contemplated for oxygen separation or catalytic reactors.

Fabrication Techniques, Compositions and Substrates of the Invention

The structures of the instant invention are an improvement over prior art structures with fine counter electrodes where constriction at the point contacts can occur (the bonding of a high surface area electrode at intermediate temperature does not allow for a continuous phase of electrolyte into the electrode structure; instead the ionic conductor in the counter electrode makes point contact with the electrolyte film). Additional benefits include but are not limited to: improved adhesion between electrode and electrolyte; lower production costs due to simplified single step processing; and decreased electrode polarization.

Electrode structures comprising a porous layer of electrolyte particles on a dense electrolyte membrane with electrocatalyst material on and within the porous layer of electrolyte are known. In such electrodes, the electrocatalyst material is semi-continuous on the surface of the porous electrolyte material to create a three phase boundary (TPB) where the electrolyte material, electrocatalyst, and gas are in contact. The total amount of energy produced by a solid state fuel cell can be increased by stacking the cells anode to cathode. Interconnect layers are placed between the anode and cathode layers of adjacent cells to provide electrical connection from cell to cell and to serve as a barrier between the cells to prevent the migration of fuel or oxidant there between.

While not wishing to be bound by any particular theory or mechanism, this invention contemplates that increased performance and lower resistivity in the devices of the instant invention result from the simultaneous firing of the electrode/electrolyte/electrode tri-layer structure because the neck sizes at each electrode/electrolyte interface increases thereby substantially providing for a better connection and decreased resistance between electrodes. It is further contemplated that the uniformity of neck sizes resulting from the process of the instant invention also leads to improved performance.

In the sintering process the powder compact is heated to promote bonding of the powder particles. The major purpose of the sintering is to develop strength in the compact. The sintering temperature is such as to cause atomic diffusion and neck formation between the powder particles. The basic process is used in industry for a diversity of products and applications, ranging from catalysts, welding electrodes, explosives and heavy machinery and automotive components. When a compact of powder of a "green body" is subjected to sintering conditions, the points of contact are allowed to fuse and form inter-particle neck regions.

The inventors have surprisingly discovered that intimate bonding between the ionically conducting phase in the electrode and the thin film electrolyte facilitates the performance of the resulting devices. This type of intimate bonding occurs at temperatures required to sinter such materials.

Importantly, electrode materials must be chosen that do not have adverse reactions with the thin-film electrolyte at the temperatures required to densify the electrolyte in the tri-layer structure. A non-limiting example includes LSM-65 as an electrode material and YSZ as an electrolyte material.

Figure 3:
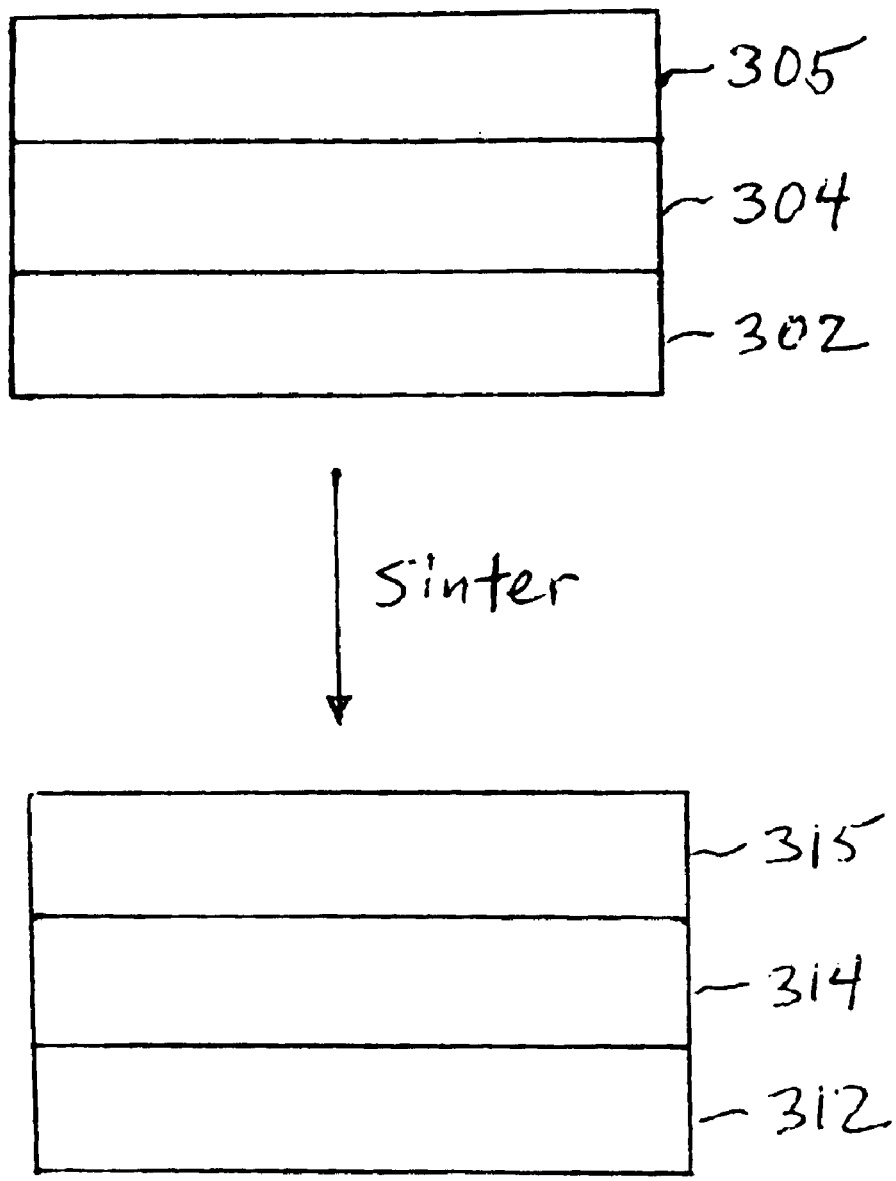
FIG. 3 depicts stages in a firing process in accordance with one embodiment the present invention.

FIG. 3 depicts stages in a firing process in accordance with one embodiment the present invention. A solid-state electrochemical device electrode material 302 is formed and deposited thereon with an electrolyte material 304. An electrode material 305 is deposited on the electrolyte. The electrode material 302 and 305 may be a cermet, for example, composed of 50 vol % Al$_2$O$_3$ (e.g., AKP-30) and 50 vol % Inconel 600 (available from Powder Alloy Corp) with a small amount of binder (e.g., XUS 40303 from Dow Chemical Company). The cermet components may be mixed in water and dried, and the resulting powder ground and sieved, for example to less than about 100 $\mu$m. The powder may be pressed (e.g., at about 5000 lbs.) in the form of a disk.

Of course, other solid-state electrochemical device electrodes may also be used. Suitable electrode materials in accordance with the present invention include other cermets and ceramics. Suitable ceramic components include La$_{1-x}$Sr$_x$Mn$_y$O$_{3-\delta}$($1 \geq X > 0.05$) ($0.95 \leq y \leq 1.15$) ("LSM"), La$_{1-x}$Sr$_x$CoO$_{3-\delta}$($1 \leq X \geq 0.10$) ($\delta$ is defined here and throughout the specification as that value signifying a small deviation from perfect stoichiometry known to those of ordinary skill in the art) ("LSC"), SrCo$_{1-x}$Fe$_x$O$_{3-\delta}$($0.30 > X$ $0.20$), La$_{0.6}$Sr$_{0.4}$Co$_{0.6}$Fe$_{0.4}$O$_{3-\delta}$, Sr$_{0.7}$Ce$_{0.3}$MnO$_{3-\delta}$, LaNi$_{0.6}$Fe$_{0.4}$O$_3$, Sm$_{0.5}$Sr$_{0.5}$CoO$_3$, yttria stabilized zirconia (YSZ), scandia stabilized zirconia (SSZ), (CeO$_2$)$_{0.8}$ (Gd$_2$O$_3$)$_{0.2}$ (CGO), La$_{0.8}$Sr$_{0.2}$Ga$_{0.85}$Mg$_{0.15}$O$_{2.825}$ (LSGM20-15), (Bi$_2$O$_3$)$_{0.75}$(Y$_2$O$_3$)$_{0.25}$ and alumina.

Preferred LSM materials include La$_{0.8}$Sr$_{0.2}$MnO$_3$, La$_{0.65}$Sr$_{0.30}$MnO$_{3-\delta}$, La$_{045}$Sr$_{0.55}$MnO$_{3-\delta}$. Suitable metal components for the cermets are transition metals Cr, Fe, Ag and/or alloys such as low-chromium ferritic steels, such as type 405 and 409 (11–15% Cr), intermediate-chromium ferritic steels, such as type 430 and 434, (16–18% Cr), high-chromium ferritic steels, such as type 442, 446 and E-Brite (19–30% Cr), chrome-based alloys such as Cr5Fe1Y and chrome-containing nickel-based Inconel alloys including Inconel 600 (Ni 76%, Cr 15.5%, Fe 8%, Cu 0.2%, Si 0.2%, Mn 0.5%, and C 0.08%).

Contemplated for the substrate materials for which the electrode/electrolyte/electrode structure may be affixed are porous metals such as the transition metals chromium, silver, copper, iron and nickel, or a porous alloy such as low-chromium ferritic steels, such as type 405 and 409 (11–15% Cr), intermediate-chromium ferritic steels, such as type 430 and 434, (16–18% Cr), high-chromium ferritic steels, such as type 442, 446 and E-Brite (19–30% Cr), chrome-based alloys such as Cr5Fe1Y and chrome-containing nickel-based Inconel alloys including Inconel 600 (Ni 76%, Cr 15.5%, Fe 8%, Cu 0.2%, Si 0.2%, Mn 0.5%, and C 0.08%).

In some embodiments of the present invention, the substrate may be a porous non-nickel cermet incorporating one or more of the transition metals Cr, Fe, Cu and Ag, or alloys thereof.

The electrolyte material 304 may be a thin layer of a metal oxide (ceramic) powder, such as yttria stabilized zirconia (YSZ) (e.g., $(ZrO_2)_x (Y_2O_3)_y$ where $(0.88 \leq X \ 0.97)$ and $(0.03 \leq y \leq 0.12)$, preferred are $(ZrO_2)_{0.92}(Y_2O_3)_{0.08}$ or $(ZrO_2)_{0.90}(Y_2O_3)_{0.10}$ available for example, from Tosoh Corp. Other possible electrolyte materials include $(ZrO_2)_{0.9}(Sc_2O_3)_{0.1}$ scandia stabilized zirconia (SSZ), $(CeO_2)_{0.8}(Gd_2O_3)_{0.2}$ (CGO), $La_{0.8}Sr_{0.2}Ga_{0.85}Mg_{0.15}O_{2.825}$ (LSGM20-15) and $(Bi_2O_3)_{0.75}(Y_2O_3)_{0.25}$. Alternatively, the electrolyte material may be a mixed ionic electronic conductor, for example $SrCo_{1-x}Fe_xO_{3-\delta}(0.30 \geq X \geq 0.20)$, $La_{0.6}Sr_{0.4}Co_{0.6}Fe_{0.4}O_{3-\delta}$, $Sm_{0.5}Sr_{0.5}CoO_3$ and $La_{1-x}Sr_xCoO_{3-\delta}$. Such structures may find use in oxygen separation devices, for example, as described above.

The electrolyte material 304 is generally prepared as a suspension of the powder material in a liquid media, such as water, isopropanol, and other suitable organic solvents may be applied to a surface of the electrode layer by a variety of methods, for example by one of aerosol spray, dip coating, electrophoretic deposition, vacuum infiltration, and tape casting.

At this stage, all materials are green; that is, neither material has yet been fired to a temperature sufficiently high to sinter the materials. As is known in the art, sintering refers to a process of forming a coherent mass, for example from a ceramic or metallic cermet powder, by heating without melting. The resulting coated electrode assembly may be pressed again (e.g., to about 6000 psi.) to increase the green density of the YSZ electrolyte film and enhance electrode electrolyte adhesion. Then, the assembly may be fired in an oxidizing or inert or reducing atmosphere at a temperature sufficient to sinter the substrate and densify the electrolyte, for example at about 1000–1500° C., preferably between 1200 and 1400° C., and more preferably between 1250 and 1350° C. In one example the assembly may be placed film side down in a molybdenum furnace under 2 psi flowing He. The furnace may be heated initially to 450° C., and then at a rate of 5° C./min to 1350° C., held for 4 hr, and then cooled at a rate of 5° C./min.

The fired electrode/electrolyte/electrode trilayer will shrink, for example, on the order of about 5–25% as the materials sinter and the structure densities. The fired electrolyte 314 must be sufficiently densified to provide a gas-tight barrier between the gases at each electrode. The fired electrode 312 and 315 is preferably at least 90% densified (about 10% porosity), and may be as much as about 95% densified, or even about 98% densified. After the firing, the electrode remains porous, in one embodiment to less than about 80% dense (preferably about 60 to 70% dense (about 30 to 40% porosity), in order to allow gases to diffuse through the electrode or to it.

The thickness of the electrolyte of the densified trilayer structures prepared in accordance with preferred embodiments of the present invention may be from about 1 to 50 microns; more preferably from about 3 to 30 microns; even more preferably about 5 to 20 microns. The fabrication of such thin, substantially gas-tight solid oxide films in an economical manner is an important aspect of the present invention with distinct advantages over the thicker, more expensive and/or more difficult to fabricate electrolyte layers of conventional solid state electrochemical device fabrication.

This invention contemplates other layers used in conjunction with the trilayer electrode/electrolyte/electrode structure. These include, but are not limited to substrate/support materials, and also include a plurality of layers on either side of the electrode/electrolyte/electrode composite described above. For example, on the substrate side an additional layer may be spray-coated or vacuum infiltrated onto the substrate.

FIGS. 4A–D illustrate multi-layer structures in accordance with various implementations in accordance with the present invention.

Figure 4A:
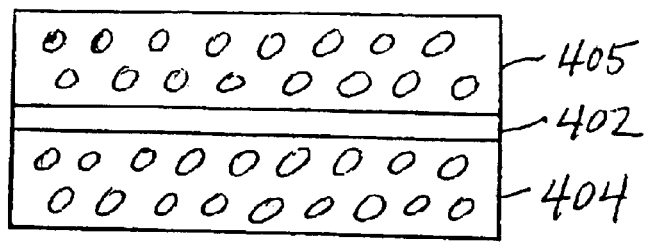
FIGS. 4A–D illustrate multi-layer electrode/electrolyte/electrode structures and composite articles in accordance with various implementations in accordance with the present invention.

FIG. 4A shows a densified electrolyte layer 402 on a porous electrode 404 and a porous electrode 405 on the electrolyte layer. This structure forms an electrochemical cell.

Figure 4B:
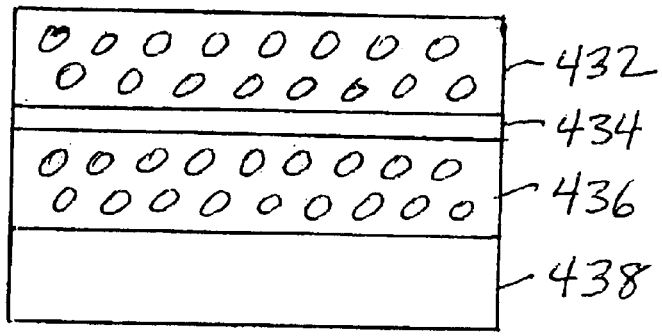

FIG. 4B shows a porous electrode layer 432 on a densified electrolyte layer 434 on a porous electrode layer 436 on a substrate 438.

Figure 4C:
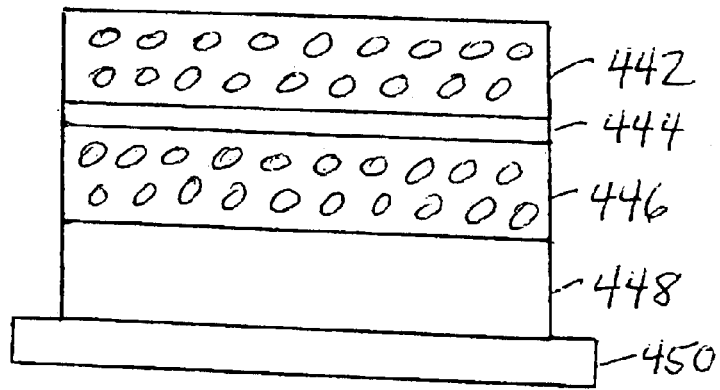

FIG. 4C shows a porous electrode layer 442 on a densified electrolyte layer 444 on a porous electrode layer 446 on a substrate 448. The substrate is bonded to an interconnect 450, in a preferred embodiment of the invention a metal interconnect.

Figure 4D:
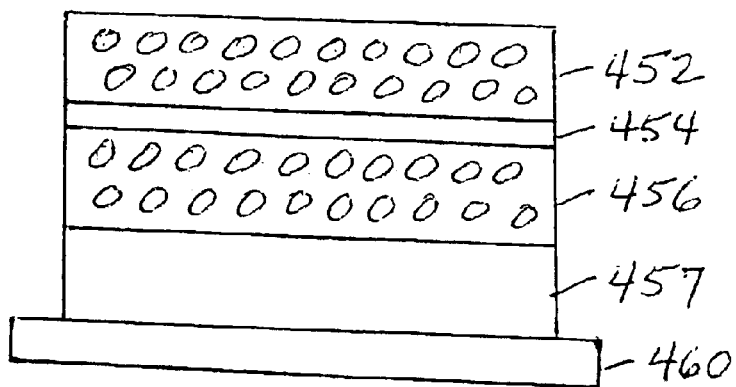

FIG. 4D shows a porous electrode layer 452 comprising Ni-YSZ on a densified electrolyte layer 454 comprising YSZ, on a porous electrode layer 456 comprising LSM-YSZ on a dual functioning layer 457 of LSM on a substrate 460. The substrate also may be bonded to an interconnect.

The techniques described herein, and the structures they produce may be used in the fabrication of a variety of electrochemical devices, as described above, to reduce cost, improve performance and reliability, and reduce operating temperature for an efficient device. It should be understood that the fabrication techniques and structures described herein might be implemented in either planar, hexagonal or tubular solid-state electrochemical device designs.

EXAMPLES

The following examples describe and illustrate aspects and features of specific implementations in accordance with the present invention. It should be understood the following is representative only, and that the invention is not limited by the detail set forth in these examples.

Example 1
LSM-YSZ/YSZ/LSM-YSZ

LSM65-YSZ+binder preparation: $La_{0.65}Sr_{0.30}MnO_3$ (LSM65) from Praxair Surface Technologies, Woodinville, Wash., USA, with a surface area of 4.71 $m^2/g$ ($d_{50}$ 1.3 $\mu m$) was placed in an alumina crucible and heated to 1175° C. in an air furnace (Lindberg 1700° C. Box Furnace) for 5 hours. $Zr_{0.04}Y_{0.16}O_{1.92}$ (YSZ) TZ-8Y from Tosoh Corporation, Yamaguchi, Japan, was placed in an alumina crucible and heated to 1200° C. in an air furnace for 4 hours. 11.4 g of the LSM65 powder, 9.3 g of the YSZ powder, 2.3 g of cornstarch (as pore former and binder) from T. Kingsford and Son, Englewood Cliffs, N.J., USA, 160 g of zirconia milling balls, and 50 ml of isopropyl alcohol were placed in an attritor mill (Szegvari Heavy Duty Attritor Mill from Union Process Incorporated, Akrin, Ohio, USA) and milled for 1 hour at 550 rpm. The resulting powder was dried, ground with a mortar and pestle, and sieved to <150 μm using a stainless steel seive.

Pre-firing of substrate: 2.5 g of the LSM65-YSZ powder were placed in a 3.81 cm diameter steel die and pressed at 10,000 lbs for 30 sec. The samples were placed on alumina discs and heated at 1° C./min to 400° C., held 30 min, heated 5° C./min to 1000° C., held 10 hours, and cooled to room temperature at 5° C./min.

Deposition of electrolyte: 1.8 g of Tosoh TZ-8Y was dispersed in 60 ml of isopropyl alcohol for 10 minutes using a Branson Sonifier (Model 450). The ~10 ml of the solution was applied to the surface of the LSM65-YSZ pre-fired disc using an aerosol spray brush from Iwata-Medea Inc., Portland Oreg., USA (Model "Eclipse") and an air pressure of 10 psi.

Deposition of counter electrode: 1.1 g of LSM65-YSZ+ cornstarch (prepared above) was dispersed in 40 ml of isopropyl alcohol and ~12 ml of the solution was applied to the electrolyte surface using the aerosol spray brush.

Sintering of the tri-layer: The sample was placed on an alumina disc and heated at 2° C./min to 400° C., hold 30 min, heated 5° C./min to 1000° C., hold 5 hours, heated 5° C./min to 1350° C., hold 5 hours, and cooled to room temperature at 5° C./min.

The resulting tri-layer disc consisting of a thick LSM65-YSZ support electrode, a thin film of YSZ, and a thin LSM65-YSZ counter electrode was 3.1 cm in diameter and all layers were well bonded to each other. This device is suitable for use as an oxygen pump.

Example 2

LSM-YSZ/YSZ/NiO-YSZ

LSM65-YSZ+binder preparation: The powder was prepared as in Example 1.

Pre-firing of substrate: Prefiring was as in Example 1.

Deposition of electrolyte: Deposition was as in Example 1.

Deposition of counter electrode: 10 g of NiO (J. T. Baker), 10 g of TZ-8Y, and 2.3 g of cornstarch were attritor milled using zirconia milling balls for 1 hour in isopropyl alcohol. The powder was dried under a heat lamp. 1.1 g of the NiO-YSZ-cornstarch was dispersed in 40 ml of isopropyl alcohol and ~12 ml of the solution was applied to the electrolyte surface with the aerosol spray brush.

Sintering of the tri-layer: The sample was placed on an alumina disc and heated at 2° C./min to 400° C., hold 30 min, heated 5° C./min to 1000° C., hold 5 hours, heated 5° C./min to 1350° C., hold 5 hours, and cooled to room temperature at 5° C./min.

The resulting tri-layer disc consisting of a thick LSM65-YSZ support electrode, a thin film of YSZ, and a thin NiO-YSZ counter electrode was ~3.1 cm in diameter and all layers were well bonded to each other. This device is suitable for use as a solid oxide fuel cell.

A protective layer for either electrode is further contemplated. In addition to providing protection, the protective layer should conduct ions generated during discharge of the negative electrode. These are known in the art and disclosed in U.S. Pat. No. 6,025,094, the contents of which are hereby incorporated in their entirety.

CONCLUSION

Although the foregoing invention has been described in some detail for purposes of clarity of understanding, those skilled in the art will appreciate that various adaptations and modifications of the just described preferred embodiments can be configured without departing from the scope and spirit of the invention. Moreover, the described processing distribution and classification engine features of the present invention may be implemented together or independently. Therefore, the described embodiments should be taken as illustrative and not restrictive, and the invention should not be limited to the details given herein but should be defined by the following claims and their full scope of equivalents.

What is claimed is:

1. A process of making a composite article comprising:
   providing a trilayer structure comprising:
      a first electrode layer,
      an electrolyte layer,
      a second electrode layer,
   sintering the trilayer structure, wherein
      said trilayer structure is hexagonal or tubular.

2. A process of making a composite article as claimed in claim 1, wherein the first electrode layer comprises one or more electronic and/or MIEC and an ionic conductor or MIEC,
   the electrolyte layer comprises predominately an ionically conducting electrolyte material, and
   the second electrode layer comprising one or more electronic and/or MIEC and an ionic conductor or MIEC.

3. A process of making a composite article as claimed in claim 2, wherein the MIEC is non-reactive with the electrolyte layer material at the sintering temperature of the composite article.

4. A process of making a composite article as claimed in claim 1, wherein the first and/or second electrode comprise particles that are larger than about 0.25 μm but less than about 10 μm, prior to sintering.

5. A process of making a composite article as claimed in claim 1, wherein
   the electrolyte layer has a porosity of less than 5% after sintering.

6. A process of making a composite article as claimed in claim 1, wherein
   the electrode layers have a porosity of greater than 20% but less than about 60% after sintering.

7. A process of making a composite article as claimed in claim 1, wherein the trilayer structure is affixed to a substrate.

8. A process of making a composite article as claimed in claim 7, wherein the substrate comprises a porous non-noble transition metal, a porous non-noble transition metal alloy or a porous cannot incorporating one or more of a non-noble non-nickel transition metal and a non-noble transition metal alloy.

9. A process of making a composite article as claimed in claim 1, wherein the sintering is conducted at a temperature sufficient to substantially sinter and densify the electrolyte layer without melting the electrodes.

10. A process of making a composite article as claimed in either of claim 1 or 9, wherein the sintering is conducted at about 1000° C. to about 1500° C.

11. A process of making a composite article as claimed in claim 10, wherein the sintering is conducted at about 1200° C. to about 1400° C.

12. A process of making a composite article as claimed in claim 11, wherein the sintering is conducted at about 1250° C. to about 1350° C.

13. A process of making a composite article as claimed in claim 1, wherein the sintered electrolyte layer is gas-tight and greater than about 90% densified.

14. A process of making a composite article as claimed in claim 1, wherein the sintered electrolyte layer is gas-tight and greeter than about 95% densified.

15. A process of making a composite article as claimed in claim 1, wherein the sintered electrolyte layer is no more than 2% porous.

16. A process of making a composite article as claimed in claim 1, wherein the sintered electrolyte layer is about 1 to 50 microns thick.

17. A process of making a composite article as claimed in claim 16, wherein the sintered electrolyte layer is about 3 to 30 microns thick.

18. A process of making a composite article as claimed in claim 17, wherein the sintered electrolyte layer is about 5 to 20 microns thick.

19. A process of making a composite article as claimed in claim 1, wherein said trilayer structure is planar.

20. A process of making a composite article as claimed in claim 1, wherein said trilayer structure is tubular.

21. A process of making a composite article as claimed in claim 1, wherein said trilayer structure is hexagonal.

22. A process of making a composite article as claimed in claim 7, wherein said substrate is an alloy selected from the group consisting of a low-chromium ferritic steel, an intermediate-chromium ferritic steel, a high-chromium ferritic steel, a chrome-based alloy, and chrome-containing nickel-based Inconel alloy.

23. A process of making a composite article as claimed in claim 22, wherein said alloy is selected from the group consisting of $Cr_5Fe1Y$ and Inconel 600.

24. A process of making a composite article as claimed in claim 7, wherein said substrate material is a cermet selected from the group consisting of at least one of $La_{1-x}Sr_xMn_yO_{3-\delta}$ ($1 \geq X \geq 0.05$)($0.95 \leq y \leq 1.15$)("LSM"), $La_{1-x}Sr_xCoO_{3-\delta}$ ($1 \geq X \geq 0.10$)("LSC"), $SrCo_{1-x}Fe_xO_{3-\delta}$ ($0.30 \geq X \geq 0.20$), $La_{0.06}Sr_{0.4}Co_{0.6}Fe_{0.4}O_{3-\delta}$, $Sr_{0.7}Ce_{0.3}MnO_{3-\delta}$ $LaNi_{0.6}Fe_{0.4}O_{3-\delta}$, yttria stabilized zirconia (YSZ), scandia stabilized zirconia (SSZ), $(CeO_2)_{0.8}(Gd_2O_3)_{0.2}$ (CGO), $La_{0.8}Sr_{0.2}Ga_{0.83}Mg_{0.15}O_{2.825}$(LSGM20-15), $(Bi_2O_3)_{0.75}(Y_2O_3)_{0.25}$ and alumina, in combination with at least one of transition metals Cr, Fe, Cu, Ag, an alloy thereof, a low-chromium ferritic steel, an intermediate-chromium ferritic steel, a high-chromium ferritic steel, a chrome-based alloy, and chrome-containing nickel-based Inconel alloy.

25. A process of making a composite article as claimed in claim 24, wherein the LSM is selected from the group consisting of $La_{0.8}Sr_{0.2}MnO_{3.8}$, $La_{0.65}Sr_{0.30}MnO_{3.8}$, $La_{0.45}Sr_{0.55}MnO_{3.8}$.

26. A process of making a composite article as claimed in claim 25, wherein said chrome based alloy is $Cr_5Fe1Y$.

27. A process of making a composite article as claimed in claim 1, wherein said electrolyte comprises at least one of yttria stabilized zirconia (YSZ), scandia stabilized zirconia (SSZ), doped cerium oxide including $(CeO_2)_{0.8}(Gd_2O_3)_{0.2}$ (CGO), $La_{0.8}Sr_{0.2}Ga_{0.85}Mg_{0.15}O_{2.825}$(LSGM20-15) and $(Bi_2O_3)_{0.75}(Y_2O_3)_{0.25}$.

28. A process of making a composite article as claimed in claim 27, wherein said electrolyte is yttria stabilized zirconia.

29. A process of making a composite article as claimed in claim 28, wherein said yttria stabilized zirconia is $(ZrO_2)_x(Y_2O_3)_y$, where ($0.88 \geq X \geq 0.97$) and ($0.03 \leq y \leq 0.12$).

30. A process of making a composite article as claimed in claim 29, wherein said yttria stabilized zirconia is at least one of $(ZrO_2)_{0.92}(Y_2O_3)_{0.08}$ and $(ZrO_2)_{0.90}(Y_2O_3)_{0.10}$.

31. A process of making a composite article according to claim 1, wherein the electrolyte is a mixed ionic electronic conductor.

32. A process of making a composite article as claimed in claim 31, wherein said electrolyte comprises at least one of $SrCo_{1-x}Fe_xO_{3-\delta}$($0.30 \geq X \geq 0.20$), $La_{0.6}Sr_{0.4}Co_{0.6}Fe_{0.4}O_{3-\delta}$, $Sm_{0.5}Sr_{0.5}CoO_{3-\delta}$ and $La_{1-x}Sr_xCoO_{3-\delta}$.

33. A process of making a composite article as claimed in claim 32, wherein said electrolyte is $SrCo_{0.75}Fe_{0.25}O_{3-\delta}$.

34. A process of making a composite article as claimed in claim 1, wherein the composite article has an ohmic area specific resistance frown about 0.5 ohm $cm^2$ to about 0.05 ohm $cm^2$ during operation of the composite article.

35. A composite article made according to the process of claim 1, wherein the composite article has an ohmic area specific resistance of from about 0.5 ohm $cm^2$ to about 0.25 ohm $cm^2$ during operation of the composite article.

36. A composite article made according to the process of claim 1, wherein the composite article has an ohmic area specific resistance of less than about 0.05 ohm $cm^2$ during operation of the composite article.

37. A process of making a solid oxide fuel cell comprising:
   providing a trilayer structure comprising:
      a first electrode layer,
      an electrolyte layer,
      a second electrode layer,
   sintering the trilayer structure, wherein
      said trilayer structure is hexagonal or tubular.

* * * * *